United States Patent Office

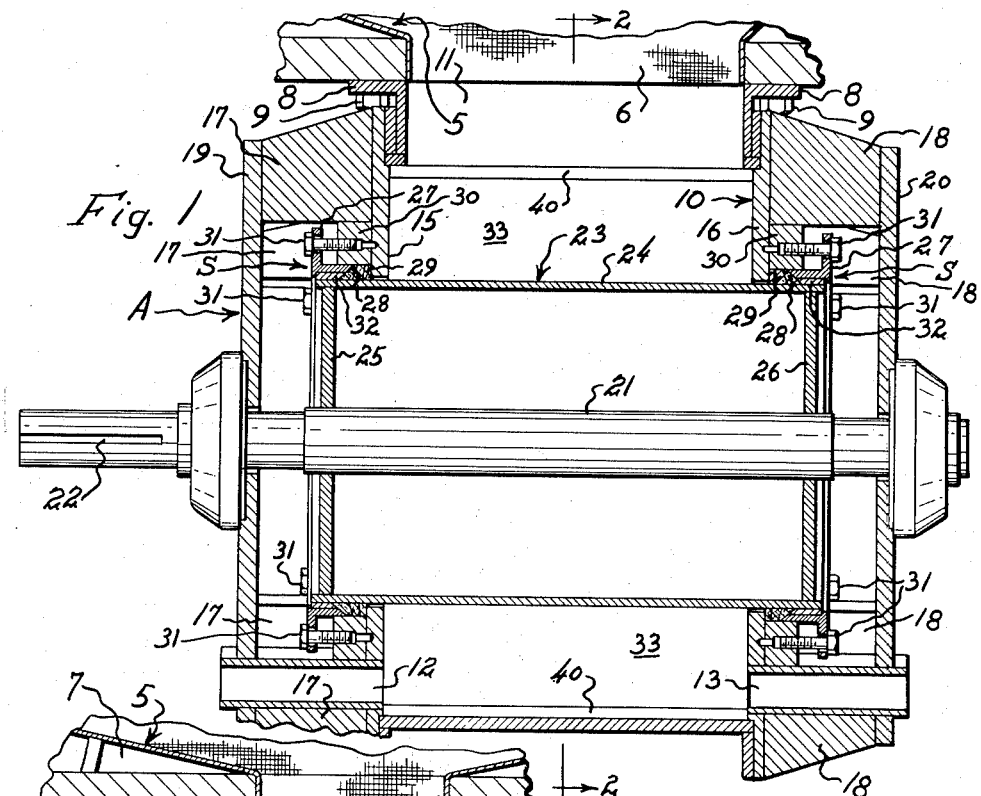
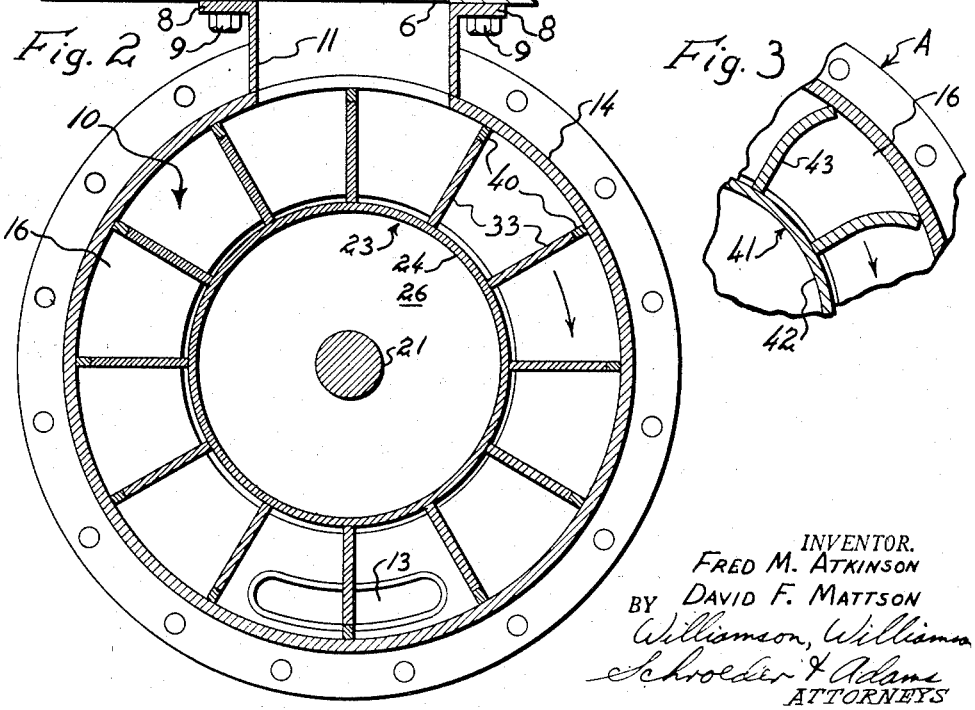
INVENTOR.
FRED M. ATKINSON
DAVID F. MATTSON
BY
Williamson, Williamson, Schroeder & Adams
ATTORNEYS

2,779,634
Patented Jan. 29, 1957

2,779,634

ACTUATOR FOR FLUIDIZED CONVEYING SYSTEMS

Fred M. Atkinson and David F. Mattson, Minneapolis, Minn., assignors to Atkinson Bulk Transport Company, Minneapolis, Minn., a corporation of Minnesota Application March 2, 1953, Serial No. 339,801

4 Claims. (Cl. 302—49)

This invention relates to actuators for use in conveying pulverulent materials by fluidization of the materials and subjecting the same to a stream of moving air under relatively high pressures. More particularly, it relates to an actuator uniquely constructed to enable relatively high pressures to be utilized at one side thereof without causing the actuator to vary from its intended axis of rotation.

This application is related to application Serial No. 339,802, filed March 2, 1953, and entitled "Apparatus for Conveying Pulverulent Material" and discloses and claims the structure of the actuator, two of which are utilized in the invention claimed in this prior application. The actuator disclosed and claimed herein is also disclosed but not claimed in that related application. The instant application is directed toward claiming the structure of the actuator itself alone and apart from other structure since it solves a number of problems in a unique and novel manner.

It is a general object of our invention to provide a novel and improved actuator for use in initiating and maintaining a fluidized flow of pulverulent material for substantial distances either horizontally or vertically.

A more specific object is to provide novel apparatus for engaging inert and non-fluidized pulverulent materials and actuating them to place them into a fluidized state and project them to points removed from the mechanism in a manner heretofore not known.

A still more specific object is to provide a novel and improved actuator for simultaneously fluidizing and propelling pulverulent materials to remote locations, this apparatus being constructed to permit the same to rotate truly about its longitudinal axis despite the utilization of pressures substantially above those normally used in the conveyance of pulverulent materials.

Another object is to provide a novel actuator apparatus for use in actuating and propelling pulverulent materials constructed to preclude bowing or bending of the same despite the utilization of a differential in pressures on opposed sides thereof amounting to approximately 15 to 20 pounds per square inch.

These and other objects and advantages of our invention will more fully appear from the following description made in connection with the accompanying drawings, wherein like reference characters refer to the same or similar parts throughout the several views, and in which:

Fig. 1 is a vertical sectional view taken through an actuator constructed in accordance with our invention;

Fig. 2 is a vertical sectional view taken along approximately line 2—2 of Fig. 1; and Fig. 3 is a fragmentary sectional view of a modification of the embodiment shown in Fig. 1 showing a different type of blade which may be used in connection with our invention.

As disclosed in the above mentioned application, we have found that it is possible to convey pulverulent materials by subjecting such materials to pressures substantially above those previously used in pneumatic conveying and by utilizing a flow of air under such pressure to fluidize such materials, the same air which accomplishes the fluidization being used to create the pressure within the fluidization chamber so that the pulverulent materials may be transported cheaply, simply and efficiently.

The instant application is also related to an application, Serial No. 248,955, filed September 29, 1951, by Fred M. Atkinson, one of the joint inventors of the instant application and entitled "Method and Apparatus for Handling Pulverulent Materials," now Patent No. 2,694,496, issued Nov. 16, 1954. Utilization of the structure disclosed and claimed in this prior application has shown that there is a need for a simple way of withdrawing pulverulent materials from the pulverulent-material-holding chamber and introducing the same into the fluidization compartment in such a manner that both the fluidization and conveyance may be accomplished simply, cheaply and simultaneously.

Our present invention is directed toward that end and is designed to accomplish these purposes in the type of conveyancing decribed in said application. Accordingly, wherever in the claims hereinafter the term "transportation of pulverulent material by fluidization" is used, it is intended to connote the movement of pulverulent materials in the same proportions relative to the amount of air used as described in said prior application. In other words, reference is thereby made to the transportation of a much greater weight of such materials than the weight of the air utilized in such conveyancing so that the material will flow out of a conveying tube such as water would flow therethrough. Therefore, when we use this term we are referring to the movement of such material many times the weight of the amount of air utilized to effect such movement. This is in contrast to pneumatic conveying wherein the amount of air utilized exceeds in weight the amount of material moved.

We have found that a shaft extending through a housing and having radial blades extending outwardly therefrom may be used as an actuator to accomplish simultaneous fluidization and conveyance when compressed air is blown longitudinally between the blades as they rotate with the shaft. We have found, however, that such a shaft and blades are not practical and feasible for use under pressures frequently utilized in order to obtain the desired distance or elevation in the transportation of the pulverulent materials. Such a shaft, under pressures in the neighborhood of fifteen to twenty pounds per square inch, which are used for such conveyance, tends to bend or bow as a result of being subjected to such a pressure on one side of the shaft in contrast to atmospheric pressures on the other side, thereby causing the outer ends of the blades to rub and wear against the housing and making it impossible to preclude the escape of air between the outer ends of the blades and the housing. Such wear, of course, soon requires the replacement of blades and the housing and causes leakage therebetween so that the entire structure is unsatisfactory for prolonged use. Our invention is directed toward providing an actuator of novel construction which will eliminate these unsatisfactory conditions.

One embodiment of our invention is shown in Figs. 1-2 connected to a chamber indicated generally as 5 adapted to hold pulverulent material and having an opening 6 in the lower portion thereof. The chamber structure is shown only fragmentarily in each of these figures, but reference may be made to our prior application referred to hereinabove for guidance in the construction of the chamber if further instruction is necessary. For the purposes of illustration, an "Air Slide" indicated generally as 7 and comprised of a false bottom of webbing through which air is forced upwardly, may be utilized to carry the pulverulent material to the opening 6 of the chamber. This "Air Slide" 7 may also be constructed in accordance with the disclosure made in Patent 2,694,496.

Rigidly connected to the chamber structure 5 by means of attaching brackets 8 and bolts 9 is an actuator indicated generally as A and embodying our invention. This actuator A includes a housing indicated generally as 10 which is generally cylindrical in shape and has a material inlet 11 at the upper portion thereof receiving the pulverulent material from the chamber 5 through its opening 6. This cylindrical housing 10 has an air inlet 12 and an outlet 13 through which the air and fluidized pulverulent material is carried. The air inlet 12 is adapted to be connected to a source of compressed air (not shown) which will furnish a pressure of fifteen to twenty pounds per square inch. The outlet 13 is adapted to be connected to a conveying conduit (no shown) which will serve to direct the flow of material to its desired location.

As best shown in Fig. 2, the housing A may include a metal tubular member 14, the axis of which is disposed horizontally and which has a pair of metal rings 15 and 16 secured to its ends and extending inwardly and radially therefrom. Welded to the metal rings 15 and 16 and extending outwardly therefrom are a plurality of support brackets such as 17 and 18 which, in turn, support a pair of support or mounting plates 19 and 20. Rotatably journaled in the support or mounting plates 19 and 20 is a shaft 21 which extends through these plates and is adapted to be connected as at 22 to a variable speed driving mechanism (not shown).

Mounted within the housing A and upon the shaft 21 and secured for rotation therewith is a drum member 23. As best shown in Fig. 1, this drum member extends through the housing A and is comprised of a metal tube 24 and a pair of filler discs 25 and 26 which are mounted on the shaft and secured thereto to rotate with the shaft and carry the tubular member 24 with it. These filler discs 25 and 26 are welded or keyed to the shaft 21.

A sealing means indicated generally by the letter S is provided for preventing the escape of air outside the housing A at each of its ends. This sealing means is comprised of a metal ring 27 which is L-shaped cross-sectionally and sloped at its inner end as at 28. A plurality of packing rings 29 is provided to extend between the drum 23 and a tightening ring 30 which is welded to the support brackets 21 and to the metal rings 15 and 16. A bolt 31 extends through the metal ring 30 to tighten the same and compress the packing rings 29 to prevent the escape of air between the plate 16 and the tubular member 24. A bronze liner 32 is also provided to withstand friction. The sealing means S is provided at each of the ends of the housing so as to preclude the escape of air at each end.

As best shown in Fig. 2, the outlet 13 is oval and arcuately shaped and the inlet 12 is similarly formed. The inlet 12 is shaped in this manner so as to introduce the compressed air from the source of compressed air across a wider arc relative to the drum 23 than would otherwise be the case if the inlet were shaped circularly. It will be noted by reference to Fig. 2, that the inlet and outlet are each positioned so as to lie outside the circumferential surface of the drum 23 and within the housing A so that the compressed air will be driven between this drum and the interior surface of the housing. The inlet 12 and the outlet 13 are positioned in the same radial plane relative to the drum 23 so that each is opposite the other and so that the flow of compressed air will tend to pass directly through the housing A along the lower portion thereof and longitudinally thereof.

Mounted on the circumferential surface of the drum 23 and extending outwardly and radially therefrom is a plurality of blade members 33 which extend between the circumferential surface of the drum to a position in close proximity to the interior surface of the housing A, the clearances being in the nature of .002 inch. These blade members 33 extend longitudinally of the drum so that as they rotate with the drum they will engage the pulverulent material descending through the opening 6 and carry the material around to a position directly in front of the inlet 12 where it will be acted upon by the flow of compressed air and will be fluidized and actuated so as to be conveyed by the compressed air outwardly through the outlet 13. These blades 33 extend in such close proximity to the interior surface of the housing A that very little, if any, air escapes therebetween. Each blade is provided with a brass tip 40. The sealing means previously described prevents any appreciable escape of air laterally between the end portions of the blade members 33.

The diameter of the drum 23 as shown is slightly less than 10 inches while the length of the individual blades is slightly over 3½ inches. Thus, it can be seen that the diameter of the drum is substantially greater than the length of one of the blade members 33, and in fact, is greater than 2½ times the length of such a blade. This relation between the diameter of the drum and the length of the blades is important in order to provide the necessary strength to preclude bowing or bending of the drum.

Fig. 3 shows another form or embodiment of our invention wherein the drum member indicated generally as 41 is comprised of a metal tubular member 42 with heavy end plates similar to the filler discs 25 and 26 but having differently shaped blades. The blades 43 of this modified form of the invention are curved in the direction of rotation as shown in Fig. 3 so that as they pass by the material discharging opening of the chamber, they will more readily engage the pulverulent material and draw it into the interior of the housing.

It can be readily seen that our improved actuator can be manufactured cheaply and simply. More important than that, however, is the fact that this actuator, because of its unique construction, will not tend to cause the shaft 21 to bend or bow but will cause the drum 23 to rotate about the longitudinal axis of the shaft 21 without any substantial variation therefrom. In other words, pressures of fifteen to twenty pounds may be introduced through the air inlet 12 without any adverse effect upon the rotation of the drum member 23 about the longitudinal axis of the shaft 21. The rigid end plates 25 and 26 positioned at the end of the tubular member 24 and adjacent the ends of the housing A prevent the relatively high pressures from having an adverse effect upon the rotating member within the housing which engages the pulverulent material and moves it to the desired position for fluidization and transportation. Thus, it can be readily seen that this actuator functions in a much more efficient and satisfactory manner and makes the conveyance of pulverulent materials by simultaneous fluidization and actuation substantially more feasible and practical.

It should be noted that our improved actuator will withdraw the pulverulent materials such as flour from the chamber 5 and bring the same in a single operation into contact with the compressed air in such a manner as to cause the pulverulent material to become simultaneously fluidized and conveyed by the flow of compressed air. The amount of wear resulting from continuous operation of a structure such as is disclosed and claimed herein is of such a relatively minor nature that it is not a serious factor in the efficient fluidization and conveyance of such pulverulent material. Thus it can be seen that we have eliminated through this new and improved actuator, one of the problems originally encountered in the efficient and practical transportation of pulverulent materials such as flour by fluidization.

It will, of course, be understood that various changes may be made in the form, details, arrangement and

What is claimed is:

1. Apparatus for use in the transportation of pulverulent material, comprising a rotatable drum, a cylindrical housing surrounding said drum, a plurality of circumferentially spaced blades fixed to said drum for rotation therewith within the housing, the outer end portions of said blades being closely spaced from the inner surface of said housing to prevent any appreciable passage of air between the blades and housing, sealing means preventing the escape of air outwardly between the side portions of said blades, said housing having a material-receiving opening formed therein for connection to a source of pulverulent material to admit such material within the housing and between the blades to be carried thereby as the blades pass by said opening during the rotation of the drum, said housing having an air inlet at one of its ends for admitting air under pressure into the interior of the housing and between the blades, means for introducing a substantially uniform quantity of air under pressure through said air inlet, said housing also having a discharge outlet at the other of its ends opposite the inlet to permit the pulverulent material to pass outwardly therethrough, the portions of said discharge outlet which are at any one time between any two adjacent blades being substantially less in area than the area between said blades taken cross-sectionally, and means for rotating said drum at a speed related to the admission of air through said inlet so that the volume of pulverulent material carried through said discharge outlet is sufficient to produce a fluidized stream of pulverulent material flowing through said discharge outlet in which the ratio by weight of air to pulverulent material in such stream is approximately one lb. of air to 80–200 lbs. of pulverulent material.

2. Apparatus for use in the transportation of pulverulent material, comprising a rotatable drum, a cylindrical housing surrounding said drum, a plurality of circumferentially spaced blades fixed to said drum for rotation therewith within the housing, the outer end portions of said blades being closely spaced from the inner surface of said housing to prevent any appreciable passage of air between the blades and housing, sealing means preventing the escape of air outwardly between the side portions of said blades, said housing having a material-receiving opening formed therein for connection to a source of pulverulent material to admit such material within the housing and between the blades to be carried thereby as the blades pass by said opening during the rotation of the drum, said housing having an air inlet at one of its ends for admitting air under pressure into the interior of the housing and between the blades, means for introducing a substantially uniform quantity of air under pressure through said air inlet, said housing also having a discharge outlet at the other of its ends opposite the inlet to permit the pulverulent material to pass outwardly therethrough, and means for rotating said drum at a speed related to the admission of air through said inlet so that the volume of pulverulent material carried to said discharge outlet is sufficient to produce a fluidized stream of pulverulent material characterized by having a bulk density approximately equal to the static bulk density of the pulverulent material in which the ratio by weight of air to pulverulent material is greater than about 35 lbs. of material to one lb. of air.

3. Apparatus for use in the transportation of pulverulent material, comprising a rotatable drum, a cylindrical housing surrounding said drum, a plurality of circumferentially spaced blades fixed to said drum for rotation therewith within the housing, the outer end portions of said blades being closely spaced from the inner surface of said housing to prevent any appreciable passage of air between the blades and housing, sealing means preventing the escape of air outwardly between the side portions of said blades, said housing having a material-receiving opening formed therein for connection to a source of pulverulent material to admit such material within the housing and between the blades to be carried thereby as the blades pass by said opening during the rotation of the drum, said housing having an air inlet at one of its ends for admitting air under pressure into the interior of the housing and between the blades, means for introducing a substantially uniform quantity of air under pressure through said air inlet, said housing also having a discharge outlet at the other of its ends opposite the inlet to permit the pulverulent material to pass outwardly therethrough, and means for rotating said drum at a speed related to the admission of air through said inlet so that the volume of pulverulent material carried through said discharge outlet is sufficient to produce a fluidized stream of pulverulent material characterized by having a bulk density approximately equal to the static bulk density of the pulverulent material.

4. Apparatus for use in the transportation of pulverulent material, comprising a rotatable drum, a cylindrical housing surrounding said drum, a plurality of circumferentially spaced blades fixed to said drum for rotation therewith within the housing, the outer end portions of said blades being closely spaced from the inner surface of said housing to prevent any appreciable passage of air between the blades and housing, sealing means preventing the escape of air outwardly between the side portions of said blades, said housing having a material-receiving opening formed therein for connection to a source of pulverulent material to admit such material within the housing and between the blades to be carried thereby as the blades pass by said opening during the rotation of the drum, said housing having an air inlet and a discharge outlet disposed in spaced relation and in communication between adjacent blades carried by said drum, means for introducing a substantially uniform quantity of air under pressure through said air inlet so that the pulverulent material is forced from between said blades through said discharge outlet, and means for rotating said drum at a speed related to the admission of air through said inlet so that the volume of pulverulent material carried to said discharge outlet is sufficient to produce a fluidized stream of pulverulent material characterized by having a bulk density approximately equal to the static bulk density of the pulverulent material in which the ratio by weight of air to pulverulent material is greater than about 35 lbs. of material to one lb. of air.

References Cited in the file of this patent

UNITED STATES PATENTS

| | | |
|---|---|---|
| 1,937,747 | Creasey | Dec. 5, 1933 |
| 2,026,732 | Farley | Jan. 7, 1936 |
| 2,104,881 | McLemore | Jan. 11, 1938 |
| 2,152,632 | Cassiere | Apr. 4, 1939 |
| 2,652,687 | Yellott | Sept. 22, 1953 |
| 2,681,748 | Weller | June 22, 1954 |